United States Patent
Chun et al.

(10) Patent No.: US 11,252,666 B2
(45) Date of Patent: *Feb. 15, 2022

(54) METHOD FOR TRANSMITTING OR RECEIVING SIGNAL IN WIRELESS LAN SYSTEM, AND DEVICE THEREFOR

(71) Applicant: LG Electronics Inc., Seoul (KR)

(72) Inventors: Jinyoung Chun, Seoul (KR); Eunsung Park, Seoul (KR); Dongguk Lim, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/641,107

(22) PCT Filed: Jun. 19, 2018

(86) PCT No.: PCT/KR2018/006905
§ 371 (c)(1),
(2) Date: Feb. 21, 2020

(87) PCT Pub. No.: WO2019/050135
PCT Pub. Date: Mar. 14, 2019

(65) Prior Publication Data
US 2020/0359320 A1    Nov. 12, 2020

Related U.S. Application Data

(60) Provisional application No. 62/563,614, filed on Sep. 26, 2017, provisional application No. 62/558,810, (Continued)

(51) Int. Cl.
*H04W 56/00* (2009.01)
*H04W 52/02* (2009.01)
(Continued)

(52) U.S. Cl.
CPC ......... *H04W 52/0229* (2013.01); *H04L 27/02* (2013.01); *H04W 52/52* (2013.01); *H04W 56/001* (2013.01); *H04W 84/12* (2013.01)

(58) Field of Classification Search
CPC ..... H04W 56/00; H04W 84/12; H04W 52/02; H04L 27/2602; H04L 27/2613
(Continued)

(56) References Cited

U.S. PATENT DOCUMENTS

2016/0373237 A1   12/2016 Shellhammer et al.
2018/0295578 A1*  10/2018 Liu ........................ H04L 27/04

FOREIGN PATENT DOCUMENTS

KR   20110069671   6/2011
KR   20120090220   8/2012

OTHER PUBLICATIONS

Intel, "WUR Beacon," IEEE 802.11-17/0343rl, dated Mar. 14, 2017, 15 pages.
(Continued)

*Primary Examiner* — Kwang B Yao
*Assistant Examiner* — Syed M Bokhari
(74) *Attorney, Agent, or Firm* — Fish & Richardson P.C.

(57) ABSTRACT

A method by which an access point (AP) transmits a wake-up radio (WUR) signal in a wireless LAN (WLAN), according to one embodiment of the present invention, comprises the steps of: determining a synchronization signal providing time synchronization for a data signal in the WUR signal; and transmitting the WUR signal including the synchronization signal and the data signal, wherein the synchronization signal can be an on-off keying (OOK) signal having a length of 128 us and generated by mapping, to 2 us symbol, each bit of a binary sequence having a length of 64, when a data rate of the data signal is 62.5 kbps.

13 Claims, 24 Drawing Sheets

Related U.S. Application Data filed on Sep. 14, 2017, provisional application No. 62/554,021, filed on Sep. 5, 2017.

(51) Int. Cl.
*H04L 27/02* (2006.01)
*H04W 52/52* (2009.01)
*H04W 84/12* (2009.01)

(58) Field of Classification Search
USPC .......................................................... 370/329
See application file for complete search history.

(56) References Cited

OTHER PUBLICATIONS

Marvell, "WUR Preamble SYNC Field Design," IEEE 802.11-17/0983r0, dated Jul. 12, 2017, 20 pages.

* cited by examiner (a)

(b)

(a)

(b)

(a)

(b)

METHOD FOR TRANSMITTING OR RECEIVING SIGNAL IN WIRELESS LAN SYSTEM, AND DEVICE THEREFOR

CROSS-REFERENCE TO RELATED APPLICATIONS

This application is a National Stage application under 35 U.S.C. § 371 of International Application No. PCT/KR2018/006905, filed on Jun. 19, 2018, which claims the benefit of U.S. Provisional Applications No. 62/554,021 filed on Sep. 5, 2017, No. 62/558,810 filed on Sep. 14, 2017 and No. 62/563,614 filed on Sep. 26, 2017. The disclosures of the prior applications are incorporated by reference in their entirety.

BACKGROUND OF THE DISCLOSURE

Field of the Disclosure

The present disclosure relates to a wireless LAN system and, most particularly, to a method for transmitting or receiving wake-up radio (WUR) signals for waking-up primary connectivity radio (PCR) and a device for the same.

Related Art

Institute of Electrical and Electronics Engineers (IEEE) 802.11 is developed as standards for wireless LAN technology. IEEE 802.11a and 11b use unlicensed bands, IEEE 802.11b provides a transmission speed of 11 Mbps and IEEE 802.11a provides a transmission speed of 54 Mbps. IEEE 802.11g provides a transmission speed of 54 Mbps using orthogonal frequency-division multiplexing (OFDM) at 2.4 GHz. IEEE 802.11n provides a transmission speed of 300 Mbps for four spatial streams using multiple input multiple output-OFDM (MIMO-OFDM). IEEE 802.11n supports up to 40 MHz channel bandwidth. In this case, a transmission speed of 600 Mbps is provided.

The aforementioned wireless LAN standards use a maximum bandwidth of 160 MHz, and IEEE 802.11ax standardization developed from IEEE 802.11ac which supports eight spatial streams to support up to 1 Gbit/s is under discussion.

SUMMARY OF THE DISCLOSURE

Technical Objects

An object of the present disclosure is to provide a synchronization signal for more accurately and more efficiently transmitting and/or receiving a WUR signal.

The present disclosure will not be limited only to the aforementioned technical object. And, other technical objects may be inferred from the embodiments of the present disclosure.

Technical Solutions

In order to achieve the above-described technical object, according to an aspect of the present disclosure, a method for transmitting a wake-up radio (WUR) signal, by an access point (AP), in a wireless LAN (WLAN) may include the steps of determining a synchronization signal providing time synchronization for a data signal of the WUR signal, and transmitting the WUR signal including the synchronization signal and the data signal, wherein, when a data rate of the data signal is 62.5 kbps, the synchronization signal may be a 128 us-length on-off keying (OOK) signal being generated by mapping each bit of a length-64 binary sequence to a 2 us symbol.

In order to achieve the above-described technical object, according to another aspect of the present disclosure, an access point (AP) for transmitting a wake-up radio (WUR) signal may include a processor determining a synchronization signal providing time synchronization for a data signal of the WUR signal, and a transmitter transmitting the WUR signal including the synchronization signal and the data signal according to a control of the processor, wherein, when a data rate of the data signal is 62.5 kbps, the synchronization signal may be a 128 us-length on-off keying (OOK) signal being generated by mapping each bit of a length-64 binary sequence to a 2 us symbol.

In order to achieve the above-described technical object, according to another aspect of the present disclosure, a method for receiving a wake-up radio (WUR) signal, by a station (STA), in a wireless LAN (WLAN) may include the steps of performing time synchronization by using a synchronization signal of the WUR signal, and decoding the data signal based on the data rate for the data signal of the WUR signal, wherein, when a data rate of the data signal is 62.5 kbps, the synchronization signal may be a 128 us-length on-off keying (OOK) signal being generated by mapping each bit of a length-64 binary sequence to a 2 us symbol.

The binary sequence may start with a pattern of 1 and 0 being alternately repeated during a predetermined length.

The alternately repeating pattern of 1 and 0 may be for an auto-gain control (AGC) of the WUR signal.

The AP may determine the data rate of the data signal as one of 62.5 kbps and 250 kbps.

Manchester coding may be applied to the data signal.

In case the data rate of the data signal is 250 kbps, as a result of applying Manchester coding to the data signal, 1 symbol of the data signal may be configured of one On sub-symbol and one Off sub-symbol.

The AP may use the On sub-symbol of the data signal as a 2 us-length On symbol for the synchronization signal.

The On sub-symbol of the data signal may be generated by re-using at least part of a legacy long training field (L-LTF), a legacy-short training field (L-STF), and 1 binary phase shift keying (BPSK) symbol being transmitted from the WUR signal at a 20 MHz bandwidth.

A 1-symbol length of the data signal may be configured to be longer than length 2 us of 1 symbol for the synchronization signal.

Effects of the Disclosure

According to an embodiment of the present disclosure, by optimizing the length of a symbol and the length of a binary sequence of a synchronization signal for a WUR signal of a specific data rate, not only can a good synchronization performance (or capability) for the WUR signal can be ensured but also, since the binary sequence starts with an alternated repetition pattern of 1/0, the synchronization pattern may also be used for auto-gain control (AGC).

Apart from the aforementioned technical effect, other technical effects may be inferred from the embodiments of the present disclosure.

DESCRIPTION OF EXEMPLARY EMBODIMENTS

Hereinafter, preferred embodiments of the present disclosure will be described in detail with reference to the attached drawings. The detailed description, which will be given below with reference to the accompanying drawings, is intended to explain exemplary embodiments of the present disclosure, rather than to show the only embodiments that can be implemented according to the disclosure.

While the following detailed description includes specific details in order to provide a thorough understanding of the present disclosure, it will be apparent to those skilled in the art that the present disclosure may be practiced without such specific details. In some instances, known structures and devices are omitted, or are shown in a block diagram form focusing on important features of the structures and devices, so as not to obscure the concept of the present disclosure.

As described above, a method for efficiently using a channel having a wide bandwidth in a wireless LAN system and a device therefor will be described below. For this, a wireless LAN system to which the present disclosure is applied will be described in detail first.

Figure 1:
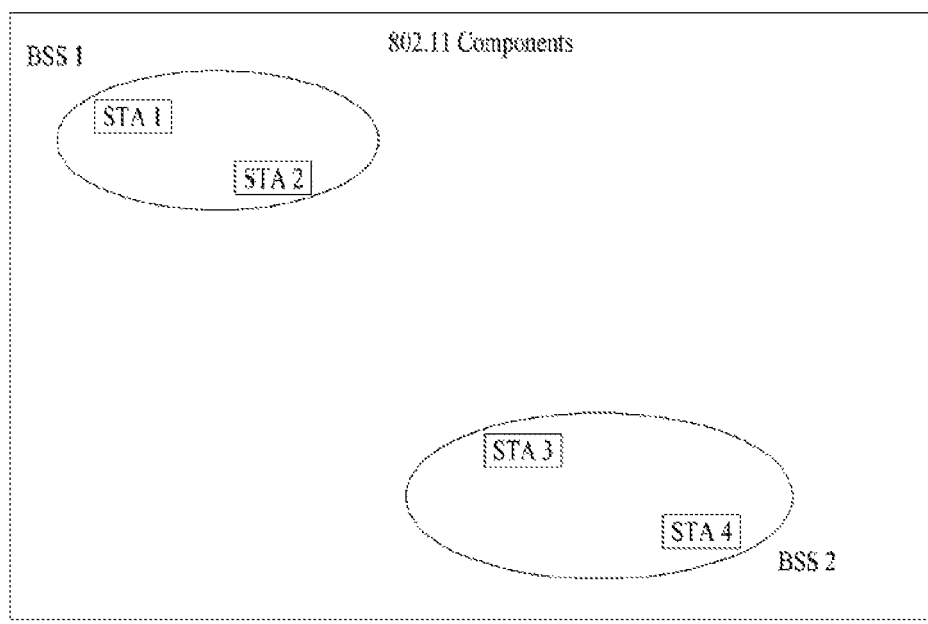
FIG. 1 is a diagram illustrating an example of a configuration of a wireless LAN system.

FIG. 1 is a diagram illustrating showing an example of a configuration of a wireless LAN system.

As illustrated in FIG. 1, the wireless LAN system includes at least one Basic Service Set (BSS). The BSS is a set of stations (STAs) that are able to communicate with each other by successfully performing synchronization.

An STA is a logical entity including a physical layer interface between a Media Access Control (MAC) layer and a wireless medium, and the STA includes an Access Point (AP) and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
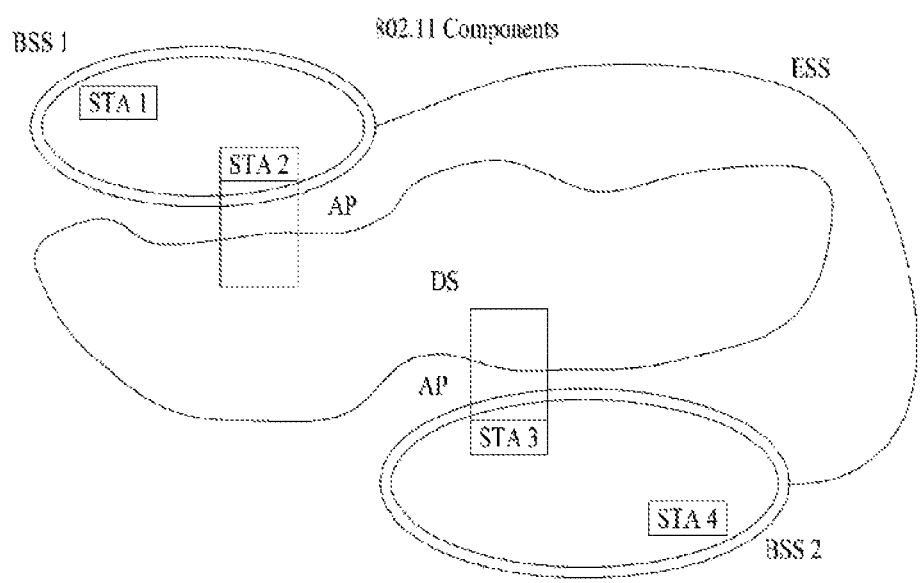
FIG. 2 is a diagram illustrating another example of a configuration of a wireless LAN system.

FIG. 2 is a diagram illustrating another example of a configuration of a wireless LAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Structure

The operation of an STA operating in a wireless LAN system can be described in terms of a layer structure. The layer structure can be implemented by a processor in terms of device configuration. An STA may have a multi-layer structure. For example, a MAC sublayer and a physical layer (PHY) on a data link layer (DLL) are mainly handled in 802.11. The PHY may include a Physical Layer Convergence Procedure (PLCP) entity, a Physical Medium Dependent (PMD) entity, and the like. The MAC sublayer and PHY conceptually include management entities called a MAC sublayer Management Entity (MLME) and a Physical Layer Management Entity (PLME), respectively. These entities provide a layer management service interface that executes a layer management function.

In order to provide correct MAC operation, a Station Management Entity (SME) is present within each STA. The SME is a layer independent entity that can be viewed as residing in a separate management plane or as residing "off to the side." The exact functions of the SME are not specified in this document, but in general this entity can be viewed as being responsible for such functions as the gathering of layer-dependent status from the various layer management entities (LMEs) and similarly setting the value of layer-specific parameters. The SME may typically perform such functions on behalf of general system management entities and implement standard management protocols.

The aforementioned entities interact in various ways. For example, entities can interact by exchanging GET/SET primitives. A primitive refers to a set of elements or parameters related to a specific purpose. XX-GET.request primitive is used to request the value of a given MIB attribute (management information based attribute information). XX-GET.confirm primitive is used to return an appropriate MIB attribute value if status="success," otherwise return an error indication in the Status field. XX-SET.request primitive is used to request that an indicated MIB attribute be set to a given value. If this MIB attribute implies a specific action, then this requests that the action be performed. XX-SET.confirm primitive is used such that, if status="success," this confirms that the indicated MIB attribute was set to the requested value, otherwise it returns an error condition in Status field. If this MIB attribute implies a specific action, then this confirms that the action was performed.

Also, various MLME_GET/SET primitives may be exchanged between MLME and SME via MLME_SAP (Service Access Point). Further, various PLME_GET/SET primitives may be exchanged between PLME and SME via PLME_SAP and between MLME and PLME via MLME-PLME_SAP.

Link Setup Process

Figure 3:
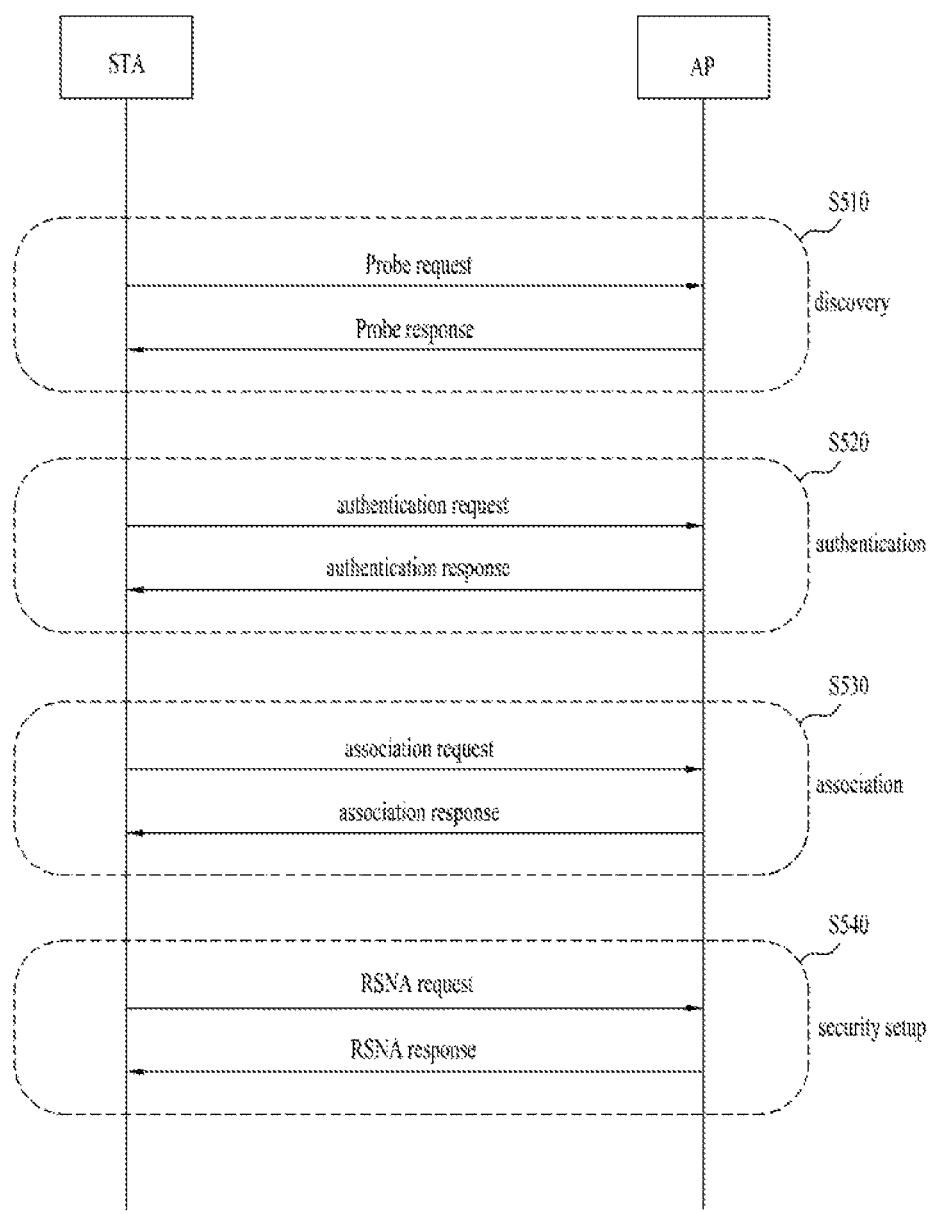
FIG. 3 is a diagram a for describing a general link setup process.

FIG. 3 is a diagram for describing a general link setup process.

To set up a link for a network and transmit/receive data, an STA needs to discover the network, perform authentication, establish association and perform an authentication process for security. A link setup process may also be referred to as a session initiation process or a session setup process. In addition, discovery, authentication, association and security setting of the link setup process may be collectively referred to as an association process.

An exemplary link setup process will be described with reference to FIG. 3.

An ST performs a network discovery operation in step S510. The network discovery operation may include a scanning operation of the STA. That is, in order to access a network, the STA need to discovery networks in which the STA can participate. The STA needs to identify a compatible network before participating in a wireless network. A process of identifying a network present in a specific area is referred to as scanning.

Scanning includes active scanning and passive scanning.

FIG. 3 illustrates an exemplary network discovery operation including active scanning. The STA that performs active scanning transmits a probe request frame in order to scan neighboring APs while moving between channels and waits for a response thereto. A responder transmits a probe response frame in response to the probe request frame to the STA that has transmitted the probe request frame. Here, the responder may be an STA that has transmitted a final beacon frame in a BSS of a channel that is being scanned. In a BSS, an AP is a responder in a BSS because the AP transmits a beacon frame. In an IBSS, a responder is not fixed because STAs in the IBSS transmit beacon frames by turns. For example, an STA that has transmitted a probe request frame on channel #1 and received a probe response frame on channel #1 may store BSS related information included in the received probe response frame, move to the next channel (e.g., channel #2) and perform scanning (i.e., transmission/reception of a probe request/response on channel #2) through the same method.

Although not shown in FIG. 3, passive scanning may be performed as a scanning operation. An STA that performs passive scanning waits for a beacon frame while moving between channels. A beacon frame is a management frame in IEEE 802.11 and is periodically transmitted to indicate presence of a wireless network and allow an STA performing scanning to discover the wireless network and participate in the wireless network. An AP serves to periodically transmit a beacon frame in a BSS and STAs transmit beacon frames by turns in an IBSS. An STA performing scanning stores information about a BSS included in a beacon frame upon reception of the beacon frame and records beacon frame information in each channel while moving to other channels. The STA that has received a beacon frame may store BSS related information included in the received beacon frame, move to the next channel and perform scanning in the next channel through the same method.

Active scanning has the advantages of less delay and less power consumption as compared to passive scanning.

After the STA discovers the network, the authentication process may be performed in step S520. This authentication process may be referred to as a first authentication process to be clearly distinguished from a security setup process of step S540 which will be described later.

The authentication process includes a process in which the STA transmits an authentication request frame to the AP and the AP transmits an authentication response frame in response thereto to the STA. An authentication frame used for an authentication request/response corresponds to a management frame.

The authentication frame may include information about an authentication algorithm number, an authentication transaction sequence number, status code, challenge text, a Robust Security Network (RSN), a finite cyclic group, and the like. This corresponds to examples of some of information that may be included in the authentication request/response and may be replaced by other types of information or further include additional information.

The STA may transmit the authentication request frame to the AP. The AP may determine whether to permit authentication of the STA based on information included in the received authentication request frame. The AP may provide an authentication processing result to the STA through the authentication response frame.

After successful authentication of the STA, the association process may be performed in step S530. The association process includes a process in which the STA transmits an association request frame to the AP and the AP transmits an association response frame in response thereto to the STA.

For example, the association request frame may include information related to various capabilities and information about a beacon listen interval, a service set identifier (SSID), supported rates, supported channels, an RSN, mobile domains, supported operating classes, a traffic indication map (TIM) broadcast request, interworking service capability, and the like.

For example, the association response frame may include information related to various capabilities and information about status code, an Association ID (AID), supported rates, an Enhanced Distributed Channel Access (EDCA) parameter set, a Received Channel Power Indicator (RCPI), a Received Signal to Noise Indicator (RSNI), mobile domains, a timeout interval (association comeback time), overlapping BSS scan parameters, TIM broadcast response, a QoS map, and the like.

This corresponds to examples of some of information that may be included in association request/response frame and may be replaced by other types of information or further include additional information.

After successful association of the STA with the network, the security setup process may be performed in step S540. The security setup process of step S540 may also be referred to an authentication process through a Robust Security Network Association (RSNA) request/response, the authentication process of step S520 may also be referred to as a first authentication process and the security setup process of step S540 may also be simply referred to as an authentication process.

The security setup process of step S540 may include a private key setup process through 4-way handshaking using an Extensible Authentication Protocol over LAN (EAPOL) frame, for example. Further, the security setup process may be performed according to a security scheme that is not defined in IEEE 802.11.

Medium Access Mechanism

In a wireless LAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since it is expected that several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception APs and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 4:
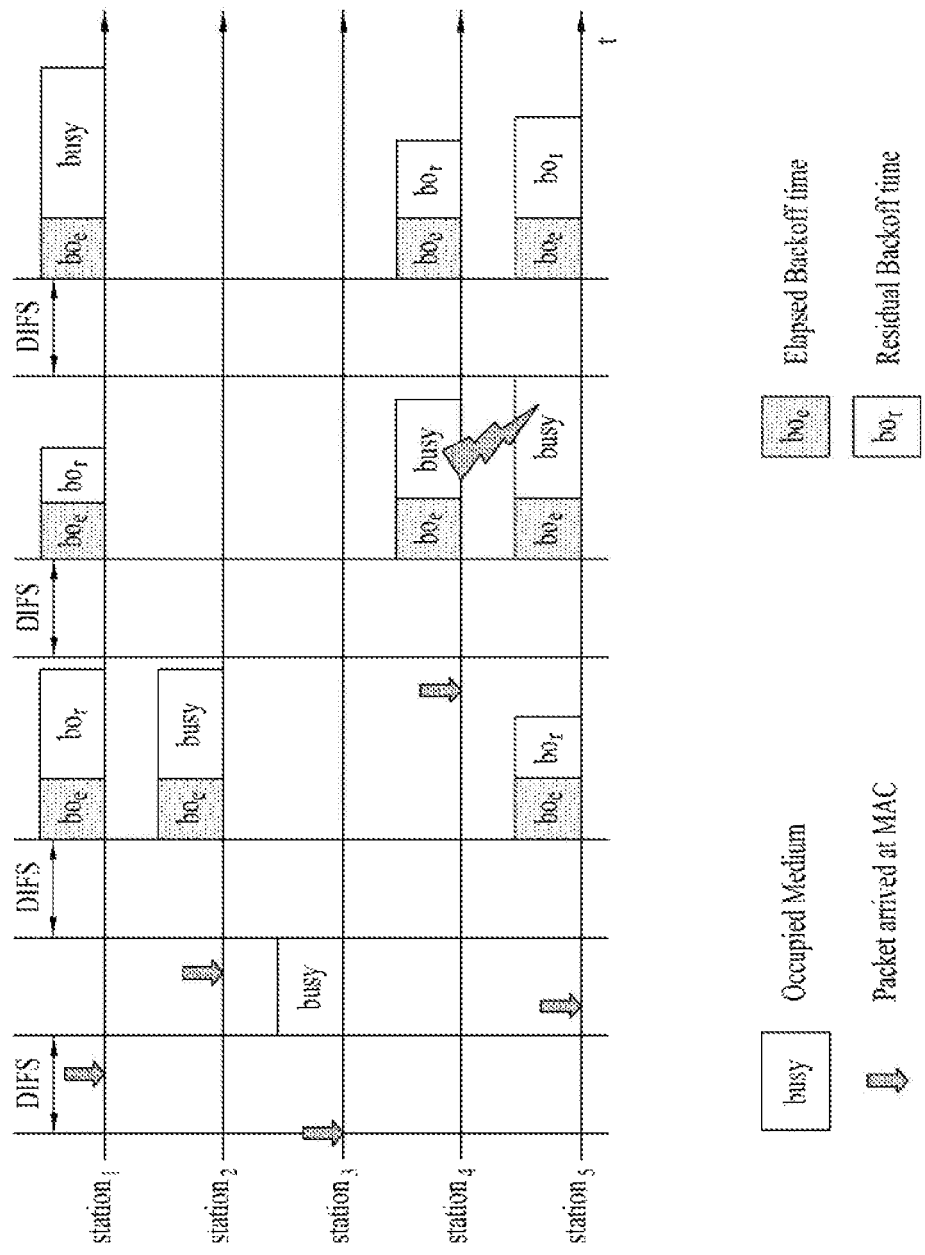
FIG. 4 is a diagram for describing a backoff process.

FIG. 4 is a diagram for describing a backoff process.

Operation based on a random backoff period will be described with reference to FIG. 4. If a medium is changed from an occupied or busy state to an idle state, STAs may attempt data (or frame) transmission. At this time, as a method for minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to 2n−1 (n=0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 4, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values. In the example of FIG. 4, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state, STA1 and STA5 wait for the DIFS and then resume countdown. That is, after the residual backoff slots corresponding to the residual backoff time are counted down, frame transmission may be started. Since the residual backoff time of STA5 is less than of STA1, STA5 starts frame transmission. If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 4, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a wireless LAN may use a network allocation vector (NAV). The NAV refers to a value of a time until a medium becomes available, which is indicated to another AP and/or STA by an AP and/or an STA which are currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 5 and 7. Although a transmission range may not be equal to an actual carrier sensing range, for convenience, it will be assumed that the transmission range may be equal to the actual carrier sensing range.

Figure 5:
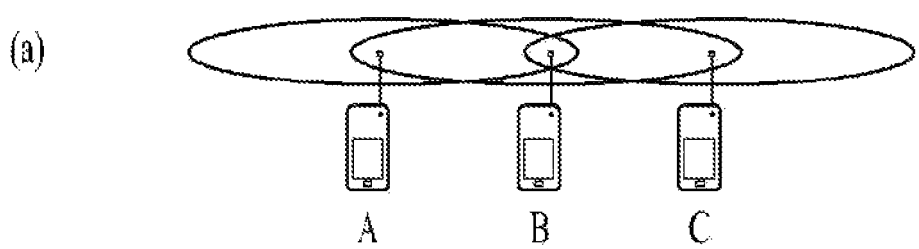
FIG. 5 is a diagram for describing a hidden node and an exposed node
Figure 5:
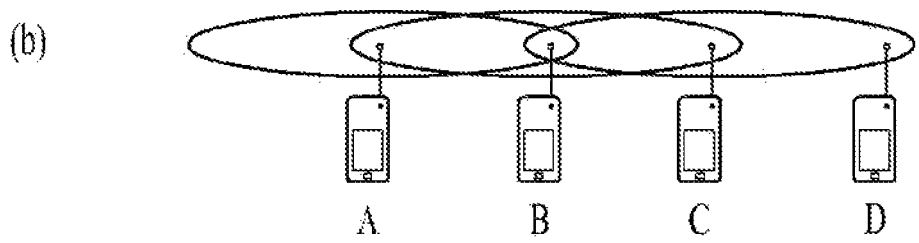

FIG. 5 is a diagram for describing a hidden node and an exposed node.

FIG. 5(a) shows a hidden node, and, in this case, an STA A and an STA B are performing communication and an STA C has information to be transmitted. More specifically, although the STA A transmits information to the STA B, the STA C may determine that the medium is in the idle state when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be a hidden node of the STA C.

FIG. 5(b) shows an exposed node and, in this case, the STA B transmits data to the STA A and the STA C has information to be transmitted to the STA D. In this case, if the STA C performs carrier sensing, it may be determined that the medium is busy due to transmission of the STA B. Accordingly, if the STA C has information to be transmitted to the STA D, the STA C waits until the medium enters the idle state since it is sensed that the medium is busy. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be an exposed node of the STA B.

Figure 6:
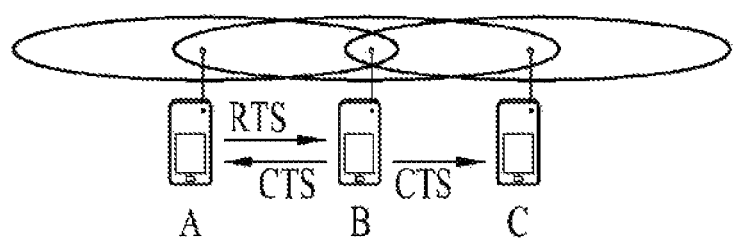
FIGS. 6(a) and 6(b) is a diagram for describing RTS and CTS.
Figure 6:
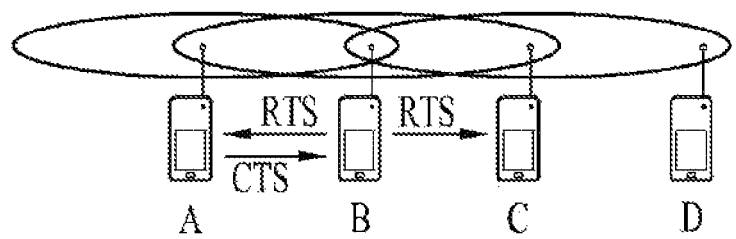

FIG. 6 is a diagram for describing RTS and CTS.

In the example of FIG. 5, in order to efficiently use a collision avoidance mechanism, short signaling packet such as request to send (RTS) and clear to send (CTS) may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 6(a) shows a method for solving a hidden node problem. It will be assumed that both the STA A and the STA C attempt to transmit data to the STA B. If the STA A transmits the RTS to the STA B, the STA B transmits the CTS to the peripheral STA A and STA C. As a result, the STA C waits until data transmission of the STA A and the STA B is finished, thereby avoiding collision.

FIG. 6(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS from the STA A, it can be ascertained that the STA A is outside carrier sensing of the STA C.

Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, a power management (PM) mode of the STA is supported in a WLAN system.

The PM mode of STAs is divided into an active mode and a power save (PS) mode. STAs fundamentally operate in an active mode. An STA which operates in the active mode is maintained in an awake state. The awake state refers to a state in which normal operation such as frame transmission and reception or channel scanning is possible. An STA which operates in the PS mode operates while switching between a sleep state or an awake state. An STA which operates in the sleep state operates with minimum power and does not perform frame transmission and reception or channel scanning.

Since power consumption is reduced as the sleep state of the STA is increased, the operation period of the STA is increased. However, since frame transmission and reception are impossible in the sleep state, the STA cannot unconditionally operate in the sleep state. If a frame to be transmitted from the STA operating in the sleep state to an AP is present, the STA may be switched to the awake state to transmit the frame. If a frame to be transmitted from the AP to the STA is present, the STA in the sleep state cannot receive the frame and cannot confirm that the frame to be received is present. Accordingly, the STA may need to perform an operation for switching to the awake state according to a specific period in order to confirm presence of the frame to be transmitted thereto (to receive the frame if the frame to be transmitted is present).

An AP may transmit beacon frames to STAs within a BSS at a predetermined period. The beacon frame may include a traffic indication map (TIM) information element. The TIM information element includes information indicating that buffered traffic for STAs related to the AP is present and the AP will transmit a frame. The TIM element includes a TIM used to indicate a unicast frame or a delivery traffic indication map (DTIM) used to indicate a multicast or broadcast frame.

Figure 7:
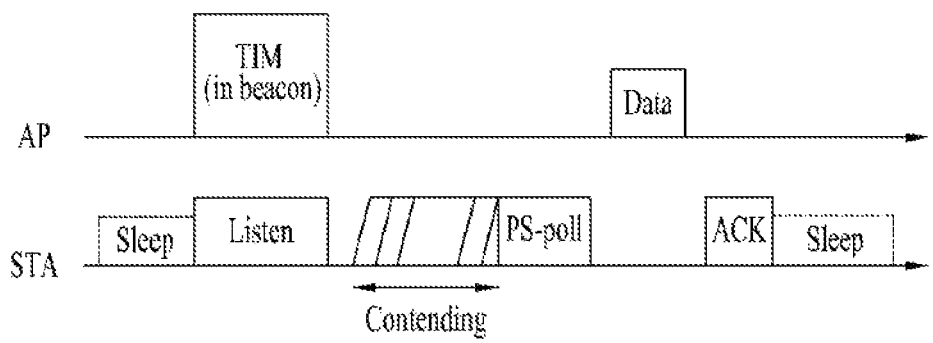
FIGS. 7 to 9 are diagrams for describing an operation of an STA which receives a TIM in detail.
Figure 8:
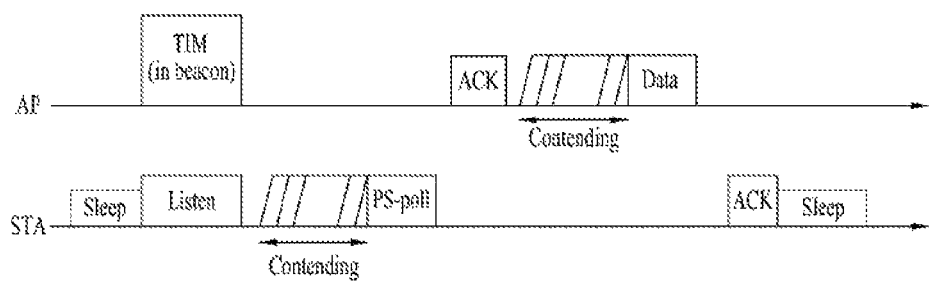
Figure 9:
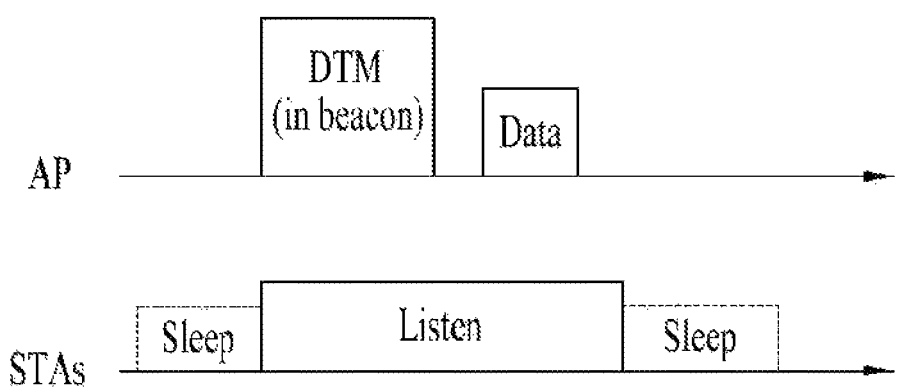

FIGS. 7 to 9 are diagrams for describing an operation of an STA which receives a TIM in detail.

Referring to FIG. 7, an STA may switch from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which has received the PS-Poll frame transmitted by the STA may transmit the frame to the STA. The STA may receive the data frame and transmit an ACK frame to the AP. Thereafter, the STA may switch to the sleep state.

As shown in FIG. 7, the AP may receive the PS-Poll frame from the STA and then operate according to an immediate response method for transmitting a data frame after a predetermined time (e.g., a short inter-frame space (SIFS)).

If the AP does not prepare a data frame to be transmitted to the STA during the SIFS after receiving the PS-Poll frame, the AP may operate according to a deferred response method, which will be described with reference to FIG. 8.

In the example of FIG. 8, the operation of the STA to switch from the sleep state to the awake state, receive a TIM from the AP, perform contending and transmit a PS-Poll frame to the AP is the same as that of FIG. 7. If the data frame is not prepared during the SIFS even when the AP receives the PS-Poll frame, an ACK frame instead of the data frame may be transmitted to the STA. If the data frame is prepared after transmitting the ACK frame, the AP may perform contending and then transmit the data frame to the STA. The STA may transmit an ACK frame indicating that the data frame has been successfully received to the AP and may switch to the sleep state.

FIG. 9 shows an example in which the AP transmits the DTIM. STAs may switch from the sleep state to the awake state in order to receive a beacon frame including the DTIM element from the AP. The STAs may ascertain that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may switch to the sleep state after completing data reception.

General Frame Structure

Figure 10:
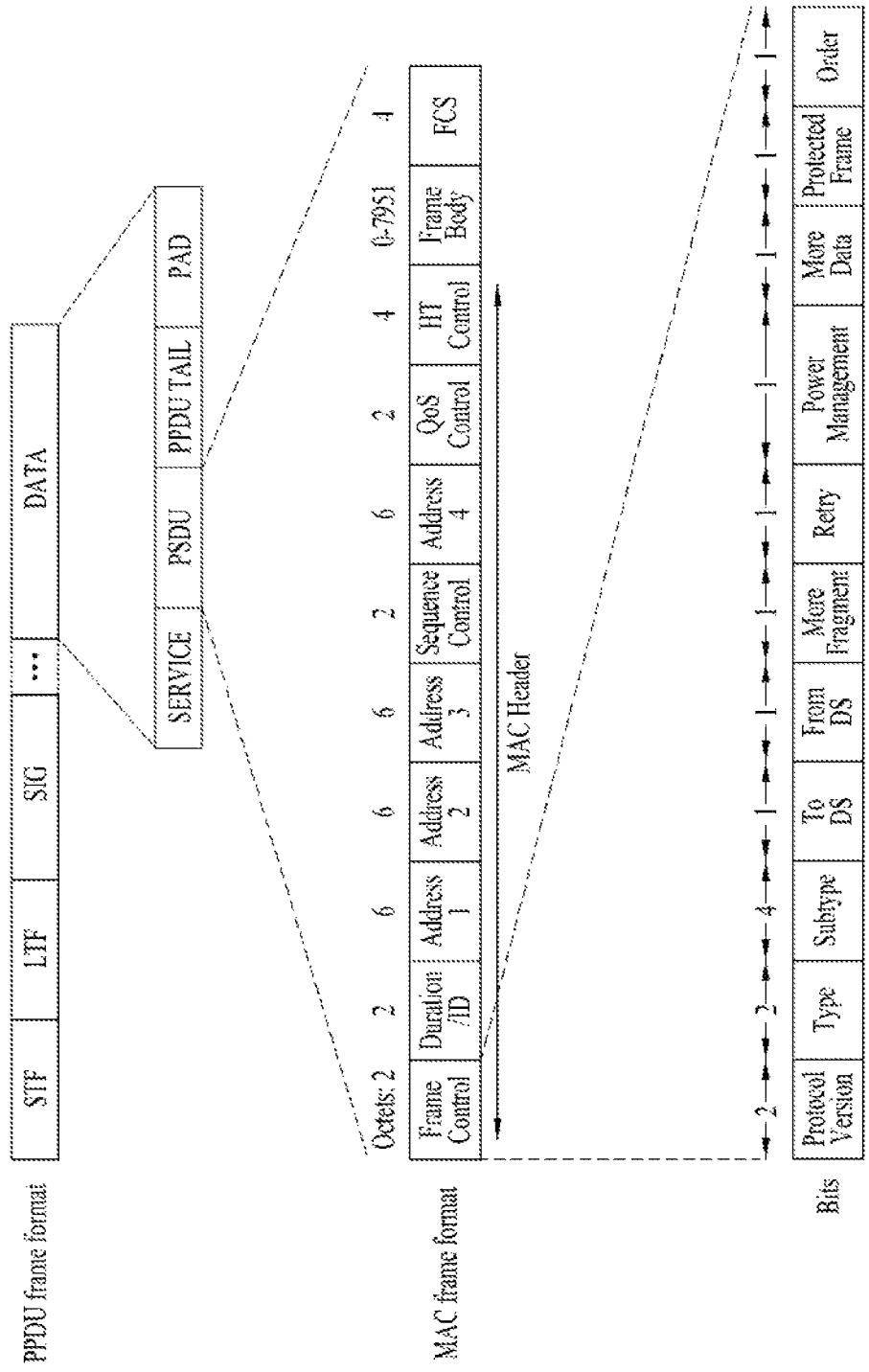
FIG. 10 is a diagram for describing an example of a frame structure used in an IEEE 802.11 system.

FIG. 10 is a diagram for describing an example of a frame structure used in an IEEE 802.11 system.

A physical layer protocol data unit (PPDU) frame format may include a short training field (STF), a long training field (LTF), a signal (SIG) field and a data field. The most basic (e.g., non-High Throughput (HT)) PPDU frame format may include only legacy-STF (L-STF), legacy-LTF (L-LTF), the SIG field and the data field.

The STF is a signal for signal detection, automatic gain control (AGC), diversity selection, accurate synchronization, and the like and the LTF is a signal for channel estimation, frequency error estimation, and the like. The STF and the LTF may be collectively referred to as a PLCP preamble, and the PLCP preamble may be a signal for synchronization of an OFDM physical layer and channel estimation.

The SIG field may include a RATE field and a LENGTH field. The RATE field may include information about data modulation and coding rate. The LENGTH field may include information about a data length. Additionally, the SIG field may include a parity bit, a SIG TAIL bit, and the like.

The data field may include a SERVICE field, a physical layer service data unit (PSDU), a PPDU TAIL bit and also include padding bits as necessary. Some bits of the SERVICE field may be used for synchronization of a descrambler at a receiving end. The PSDU corresponds to a MAC protocol data unit (MPDU) defined in the MAC layer and may include data generated/used by a higher layer. The PPDU TAIL bit can be used to return an encoder to 0 state. The padding bits can be used to adjust a data field length to a predetermined unit.

The MPDU is defined in various MAC frame formats and a basic MAC frame includes a MAC header, a frame body and a frame check sequence (FCS). The MAC frame includes a MPDU and may be transmitted/received through a PSDU of a PPDU frame format.

The MAC header includes a frame control field, a duration/ID field, and an address field. The frame control field may include control information necessary for frame transmission/reception. The duration/ID field may be set to a time for transmitting a corresponding frame.

The duration/ID field included in the MAC header may be set to a 16-bit length (e.g., B0 to B15). Content included in the duration/ID field may depend on a frame type and a sub-type, whether transmission is performed during a contention free period (CFP), QoS capability of a transmission STA, and the like. (i) In control frames having a sub-type of PS-Poll, the duration/ID field may include the AID of a transmission STA (e.g., through 14 LSBs) and 2 MSBs may be set to 1. (ii) In frames transmitted by a point coordinator (PC) or a non-QoS STA for the CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined for each frame type. For example, if B15 of the duration/ID field is set to B15=0, it indicates that the duration/ID field is used to indicate a TXOP duration, and B0 to B14 may be used to indicate an actual TXOP duration. The actual TXOP duration indicated by B0 to B14 may be any one of 0 to 32767 and the unit thereof may be microsecond (μs). However, when the duration/ID field indicates a fixed TXOP duration value (e.g., 32768), B15=1 and B0 to B14=0. If B14=1 and B15=1, the duration/ID field is used to indicate an AID and B0 to B13 indicate one AID of 1 to 2007. Reference may be made to IEEE 802.11 standard document for details of the sequence control, QoS control, HT control subfields of the MAC header.

The frame control field of the MAC header may include Protocol Version, Type, Subtype, To DS, From DS, More Fragment, Retry, Power Management, More Data, Protected Frame and Order subfields. Reference may be made to IEEE 802.11 standard document for details of the subfields of the frame control field.

WUR (Wake-Up Radio)

First, a wake-up radio receiver (WURx) compatible with a WLAN system (e.g., 802.11) will be described with reference to FIG. 11.

Figure 11:
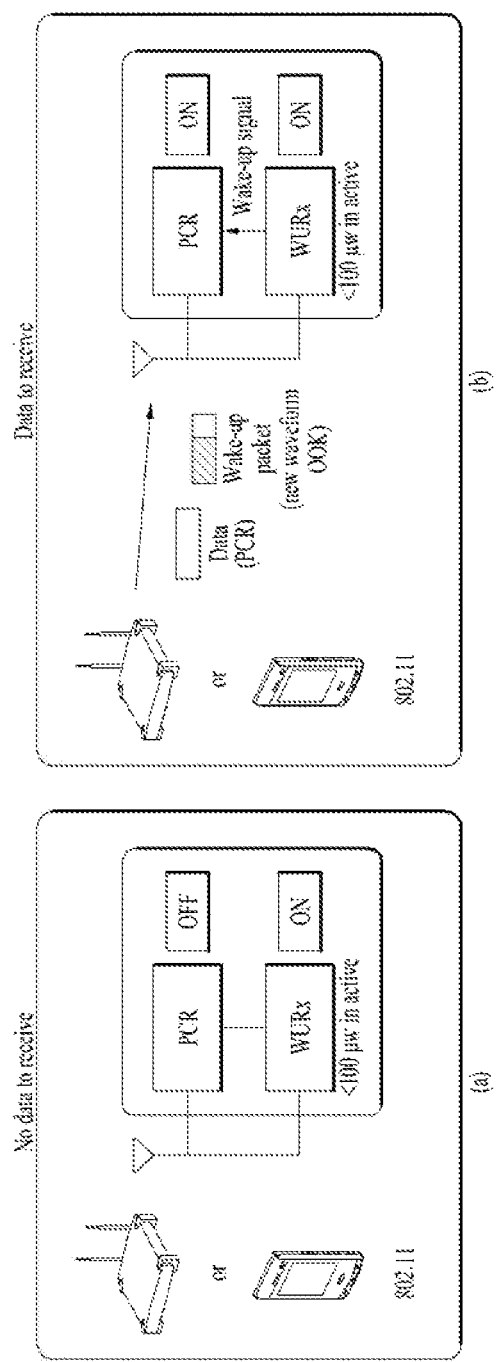
FIG. 11 is a diagram for describing a WUR receiver being available for usage in a wireless LAN system (e.g., 802.11).

Referring to FIG. 11, an STA may support primary connectivity radio (PCR) (e.g., IEEE 802.11a/b/g/n/ac/ax WLAN) and wake-up radio (WUR) (e.g., IEEE 802.11ba) for main wireless communication.

The PCR is used for data transmission and reception and may be turned off if there is no data to be transmitted/received. When the PCR is turned off, the WURx of the STA may wake up the PCR if there is a packet to be received. Accordingly, user data is transmitted and received through the PCR.

The WURx is not used for user data and may serve to wake a PCR transceiver up. The WURx may be a simple receiver that does not have a transmitter and is enabled while the PCR is turned off. It is desirable that target power consumption of the WURx do not exceed 100 microwatt (μW) in an enabled state. For such low-power operation, a simple modulation method, for example, on-off keying (OOK) may be used and a narrow bandwidth (e.g., 4 MHz or 5 MHz) may be used. A target reception range (e.g., distance) of the WURx may correspond to 802.11.

Figure 12:
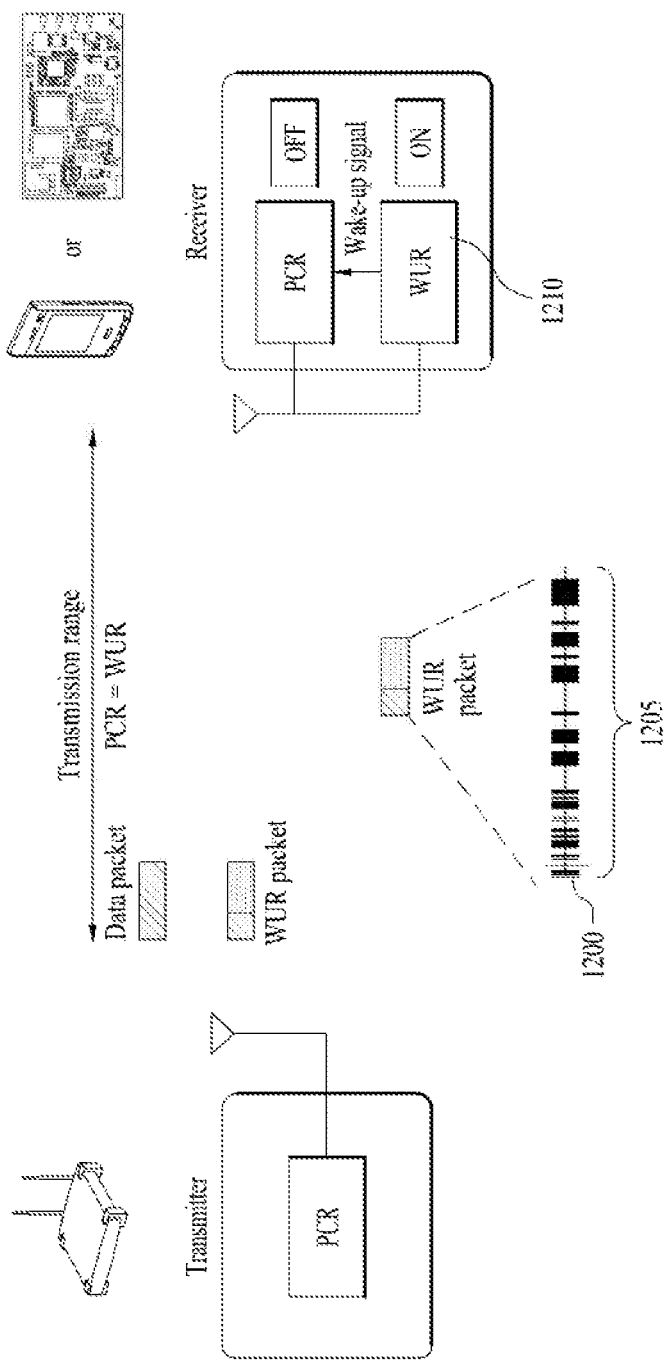
FIG. 12 is a diagram for describing WUR receiver operations.

FIG. 12 is a diagram for describing a design and operation of a WUR packet.

Referring to FIG. 12, the WUR packet may include a PCR part (1200) and a WUR part (1205).

The PCR part (1200) is for coexistence with legacy WLAN systems and may also be referred to as a WLAN preamble. In order to protect the WUR packet from other PCR STAs, at least one of L-STF, L-LTF and L-SIG of a legacy WLAN may be included in the PCR art (1200). Accordingly, a 3rd party legacy STA can ascertain that the WUR packet is not intended therefor and a PCR medium has been occupied by another STA through the PCR part (1200) of the WUR packet. However, WURx does not decode the PCR part of the WUR packet because WURx which supports narrow bands and OOK demodulation does not support PCR signal reception.

At least a part of the WUR part (1205) may be a part modulated according to OOK. For example, the WUR part may include at least one of a WUR preamble, a MAC header (e.g., receiver address or the like), a frame body and a frame check sequence (FCS). OOK modulation may be performed by modifying an OFDM transmitter.

A WURx (1210) consumes very low power of 100 µW or less, as described above, and may be implemented as a small and simple OOK demodulator.

Since the WUR packet needs to be designed to be compatible in WLAN systems as described above, the WUR packet may include the preamble (e.g., OFDM) of the legacy WLAN and new LP-WUR signal waveforms (e.g., OOK).

Figure 13:
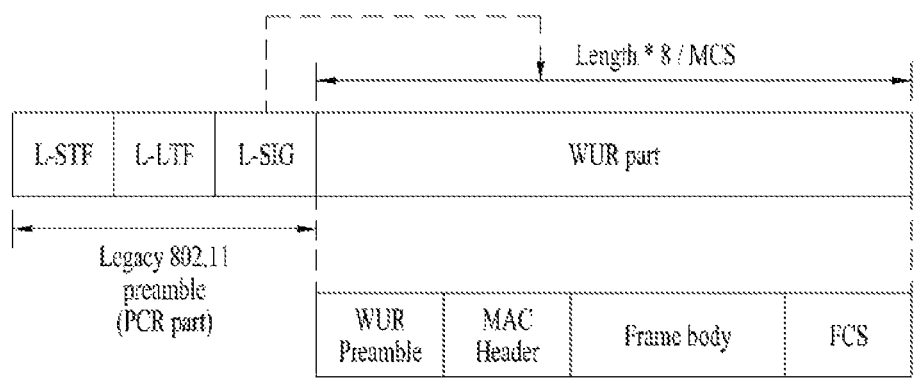
FIG. 13 illustrates an exemplary WUR packet.

FIG. 13 illustrates an exemplary WUR packet. The WUR packet of FIG. 13 includes a PCR part (e.g., legacy WLAN preamble) for coexistence with legacy STAs.

Referring to FIG. 13, the legacy WLAN preamble may include L-STF, L-LTF and L-SIG. In addition, a WLAN STA (e.g., 3rd party STA) may ascertain the end of the WUR packet through L-SIG. For example, the L-SIG field may indicate the length of a payload (e.g., OOK-modulated) of the WUR packet.

A WUR part may include at least one of a WUR preamble, a MAC header, a frame body and an FCS. The WUR preamble may include a PN sequence, for example. The MAC header may include a receiver address. The frame body may include information necessary for wake-up. The FCS may include a cyclic redundancy check (CRC).

Figure 14:
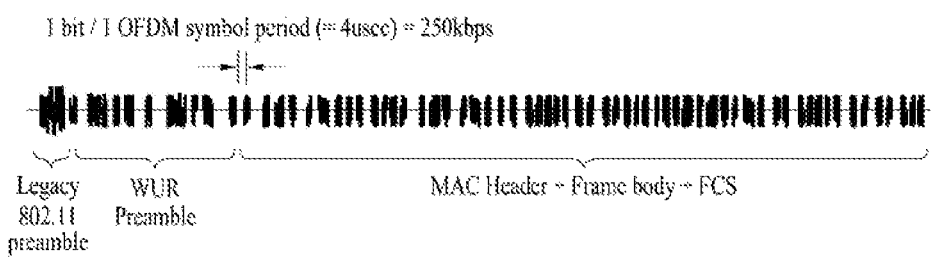
FIG. 14 illustrates exemplary waveforms of the WUR packet.

FIG. 14 illustrates waveforms of the WUR packet of FIG. 13. Referring to FIG. 14, 1 bit per OFDM symbol length (e.g., 4 µsec) may be transmitted in an OOK-modulated WUR part. Accordingly, the data rate of the WUR part may be 250 kbps.

Figure 15:
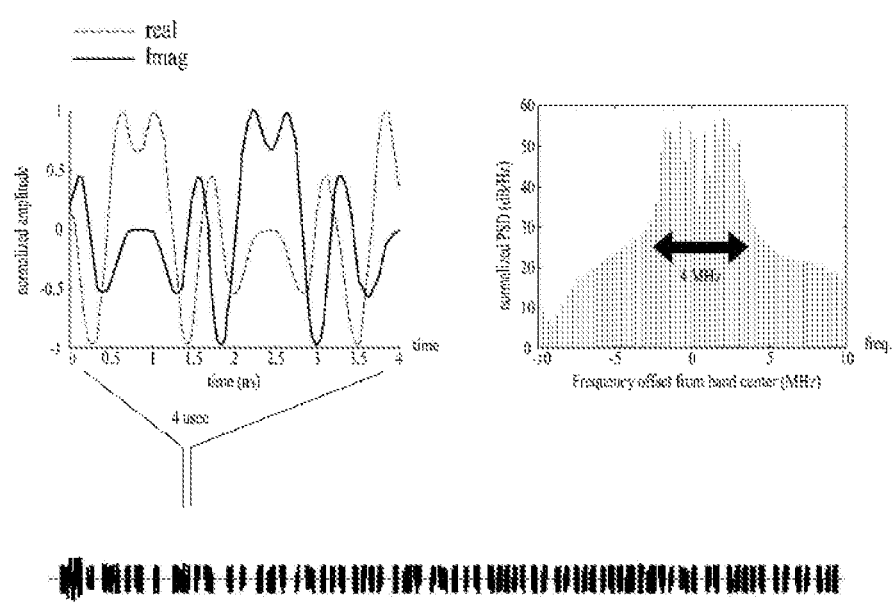
FIG. 15 is a diagram for describing the generation of a WUR packet using an OFDM transmitter of a WLAN.

FIG. 15 is a diagram for describing the generation of a WUR packet using an OFDM transmitter of a WLAN. While the phase shift keying (PSK)-OFDM transmission technique is used in the WLAN, generation of a WUR packet through an additional OOK modulator for modulation causes increase in transmitter implementation costs. Accordingly, a method for generating an OOK-modulated WUR packet by reusing an OFDM transmitter is described.

According to OOK modulation, a bit value 1 is modulated into a symbol (i.e., on) having arbitrary power loaded therein or power equal to or greater than a threshold value and a bit value 0 is modulated into a symbol (i.e., off) having no power loaded therein or power less than the threshold value. The bit value 1 may be defined as power off.

In such an OOK modulation method, the bit value 1/0 is indicated through power on/off at the corresponding symbol position. These simple OOK modulation/demodulation methods have the advantage of reducing power consumed for signal detection/demodulation of a receiver and costs for realizing the same. Further, OOK modulation of turning on/off a signal may be performed by reusing a legacy OFDM transmitter.

The left graph of FIG. 15 shows the real part and the imaginary part of a normalized amplitude for 1 symbol period (e.g., 4 µsec) with respect to a bit value 1 which is OOK-modulated by reusing an OFDM transmitter of a legacy WLAN. An OOK modulation result for a bit value 0 corresponds to power off and thus illustration thereof is omitted.

The right graph of FIG. 15 shows normalized power spectral density (PSD) on the frequency domain with respect to a bit value 1 which is OOK-modulated by reusing an OFDM transmitter of the legacy WLAN. For example, the center frequency 4 MHz in the corresponding band may be used for WUR. Although it is assumed that WUR operates with a bandwidth of 4 MHz in FIG. 15, it is for the purpose of convenience of description and other frequency bandwidths may be used. However, it is desirable that WUR operate with a narrower bandwidth than the operation bandwidth of PCR (e.g., legacy WLAN) for power saving.

In FIG. 15, it is assumed that a subcarrier spacing is 312.5 kHz and an OOK pulse bandwidth corresponds to 13 subcarriers. The 13 subcarriers correspond to approximately 4 MHz (i.e., 4.06 MHz=13*312.5 kHz) as described above.

When an input sequence of inverse fast Fourier transform (IFFT) is defined as s={13 subcarrier tone sequence} in a legacy OFDM transmitter, IFFT for the sequence s is performed such that $X_f$=IFFT(s), and then a cyclic prefix (CP) having a length of 0.8 µsec is attached thereto, a symbol length of approximately 4 µs is obtained.

The WUR packet may also be referred to as a WUR signal, a WUR frame or a WUR PPDU. The WUR packet may be a packet (e.g., WUR beacon) for broadcast/multicast or a packet (e.g., packet for ending a WUR mode of a specific WUR STA and waking up the specific WUR STA) for unicast.

Figure 16:
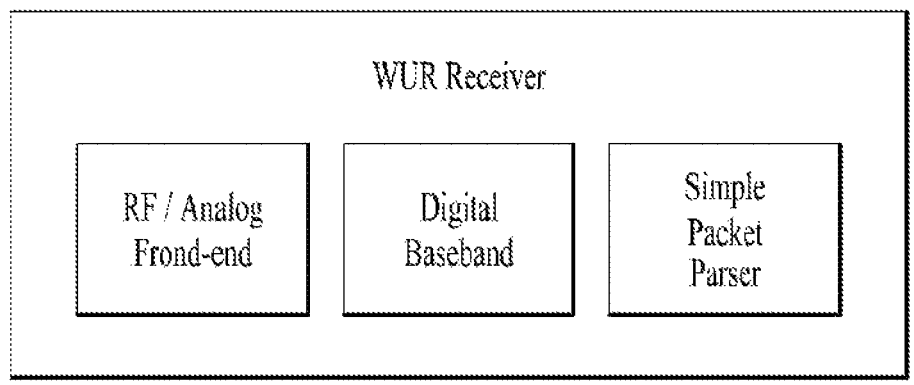
FIG. 16 illustrates an exemplary structure of a WUR receiver.

FIG. 16 illustrates a structure of an exemplary WUR receiver (WURx). Referring to FIG. 16, the WURx may include an RF/analog front-end, a digital baseband processor and a simple packet parser. FIG. 16 illustrates an exemplary configuration and the WUR receiver of the present disclosure is not limited to FIG. 16.

Hereinafter, a WLAN STA having the WUR receiver is simply referred to as a WUR STA. The WUR STA may also be simply referred to as an STA.

OOK Modulation with Manchester Coding

According to an embodiment of the present disclosure, Manchester coding may be used for OOK symbol generation. According to the Manchester coding, a 1-bit information is indicated through two sub-information (two coded bits). For example, when a 1-bit information '0' is processed with Manchester coding, two sub-information bits '10' (i.e., On-Off) are outputted. Conversely, when a 1-bit information '1' is processed with Manchester coding, two sub-information bits '01' (i.e., Off-On) are outputted. However, the On-Off order of the sub-information bits may be reversed.

A method for generating 1 OOK symbol will be described based on such Manchester coding scheme. For simplicity in the description, 1 OOK symbol is 3.2 us in the time domain and corresponds to K number of subcarriers in the frequency domain. However, the present disclosure will not be limited only to this.

Firstly, based on the Manchester coding, in the method for generating an OOK signal for a 1-bit information '0', 1

OOK symbol length may be divided into (i) 1.6 us for a first sub-information bit '1' and (ii) 1.6 us for a second sub-information bit '0'.

(i) A signal corresponding to the first sub-information bit '1' may be obtained by mapping, among the K number of subcarriers, odd-number indexed subcarriers to β and mapping even-number indexed subcarriers to 0, and then performing IFFT. For example, in case β is mapped at an interval of 2 subcarriers in the frequency domain and then IFFT is performed, a periodic signal of 1.6 us is indicated in the time domain by being repeated 2 times. Among the periodic signal of 1.6 us being repeated 2 times, the first or second signal may be used as the signal corresponding to the first sub-information bit '1'. As a power normalization factor, β may, for example, be 1/sqrt(ceil(K/2)). For example, among the total of 64 subcarriers (i.e., 20 MHz band), consecutive K number of subcarriers being used for the generation of the signal corresponding to the first sub-information bit '1' may, for example, be expressed as [33-floor(K/2): 33+ceil(K/2)−1].

(ii) A signal corresponding to the second sub-information bit '0' may be obtained by mapping K number of subcarriers to 0 and then performing IFFT. For example, among the total of 64 subcarriers (i.e., 20 MHz band), consecutive K number of subcarriers being used for the generation of the signal corresponding to the second sub-information bit '0' may, for example, be expressed as [33-floor(K/2): 33+ceil(K/2)−1].

The OOK symbol for the 1-bit information '1' may be obtained by arranging the signal corresponding to the sub-information bit '1' after the signal corresponding the sub-information bit '0'.

Symbol Reduction

For example, a 1 symbol length for WUR may be configured to be less than 3.2 us. For example, 1 symbol may be configured as information of 1.6 us, 0.8 us or 0.4 us+CP.

(i) 0.8 us, information bit 1: Among K number of consecutive subcarriers, β (e.g., power normalization factor)*1 may be mapped to the subcarriers (i.e., 1, 5, 9, . . . ) satisfying mod(subcarrier index,4)=1, and the remaining subcarriers may be nulled (e.g., the subcarriers may be mapped to 0). β may be 1/sqrt(ceil(K/4)). As described above, β*1 may be mapped at an interval of 4 subcarriers. If IFFT is performed by mapping β*1 at an interval of 4 subcarriers within the frequency domain, signals having the length of 0.8 us are repeated in the time domain, and, among such signals, one signal may be used as a signal corresponding to information bit 1.

(ii) 0.8 us, information bit 0: By mapping 0 to K number of subcarriers, and, then, by performing IFFT, time domain signals may be obtained, and, among these signals, one signal having the length of 0.8 us may be used.

(iii) 0.4 us, information bit 1: Among K number of consecutive subcarriers, β (e.g., power normalization factor)*1 may be mapped to the subcarriers (i.e., 1, 9, 17, . . . ) satisfying mod(subcarrier index,8)=1, and the remaining subcarriers may be nulled (e.g., the subcarriers may be mapped to 0). β may be 1/sqrt(ceil(K/8)). As described above, β*1 may be mapped at an interval of 8 subcarriers. If IFFT is performed by mapping β*1 at an interval of 8 subcarriers within the frequency domain, signals having the length of 0.4 us are repeated in the time domain, and, among such signals, one signal may be used as a signal corresponding to information bit 1.

(iv) 0.4 us, information bit 0: By mapping 0 to K number of subcarriers, and, then, by performing IFFT, time domain signals may be obtained, and, among these signals, one signal having the length of 0.4 us may be used.

WUR Synchronization Signal

Figure 17:
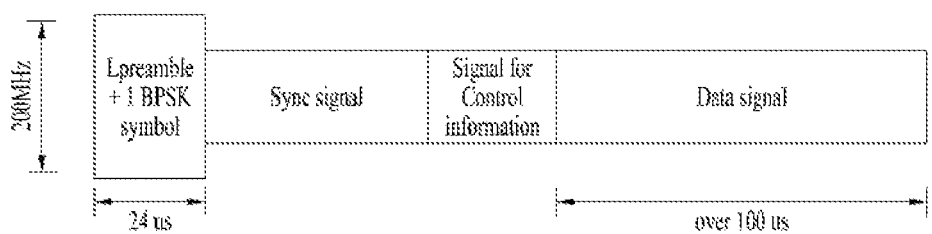
FIG. 17 illustrates an exemplary WUR packet.

FIG. 17 illustrates an exemplary WUR packet. If it is assumed that 64 bits of data are transmitted at 62.5 kbps in the data part, the length of a data signal may be equal to a maximum of 1024 us. Since the length of a WUR packet is relatively not long, it shall be important to design the synchronization signal to be as short and efficient as possible.

Each symbol for configuring the synchronization signal may be generated as an OOK signal of 4 us, 2 us, 1 us, and so on, by using the aforementioned sequence. For example, in the sequence, each OOK signal (e.g., signal of an OOK symbol) is generated for each bit being '0' or '1'. Therefore, the total length of a synchronization signal is 'length of each OOK signal*sequence length'.

Hereinafter, a synchronization signal will be proposed while considering the characteristics and length of a sequence and/or the length of a symbol, and so on.

As a synchronization sequence, a maximum length sequence (MLS) or Golay sequence having an excellent cross correlation characteristic may be considered. Additionally, as the length of 1 symbol of the synchronization sequence, 4 us, 2 us or 1 us may be considered.

For example, a symbol of 4 us, 2 us or 1 us for the synchronization sequence may be generated according to a method for generating an OOK signal, which is used for the data signal.

As another example, in case Manchester coding is used for the data signal, a sub-symbol of a Manchester coding based OOK symbol may be used as a symbol of the synchronization sequence. For example, an 'ON' part (e.g., On sub-symbol) of a Manchester OOK signal (e.g., 1 data symbol=On sub-symbol+Off sub-symbol) being used in a case where the data rate is 250 kbps may be used as a 2 us symbol for the synchronization signal. In this case, it shall be advantageous in that the AP may directly re-use part of the signal being generated for the data as the synchronization signal without having to generate a separate synchronization signal.

As another example, although the method for generating a data signal for a synchronization signal is directly applied, a CP of the synchronization signal may be differently configured from a CP of the data signal. For example, although a 'zero CP' is used when generating a data signal, a 'tail CP' may be used when generating a synchronization signal. A 'zero CP' refers to nulling a CP duration regardless of the signal. A 'tail CP' refers to using a last part of a signal corresponding to the information 1-bit or the sub-information 1-bit for Manchester coding as the CP.

A method for detecting synchronization of a WUR STA may be variously modified (or changed) according to the realization. However, for example, in order to reduce power consumption, a WUR STA may perform cross correlation by using a discrete sequence. For example, for sequence '1', a reference waveform may be defined as '1', and, for sequence '0', a reference waveform may be defined as '−1'. The WUR STA may determine that synchronization is detected in case the sum of results of multiplying the received signals by the reference waveforms is equal to a peak. In this case, a peak refers to a value being indicated during a specific time duration. Herein, the peak may be a peak value during a whole duration, or case where a specific threshold value is exceeded may be considered as the peak.

As described above, in case the WUR STA perform synchronization by using cross correlation, it is preferable to configure a synchronization signal with a sequence having an excellent cross correlation characteristic.

The length of a sequence may be determined based on a false alarm rate and a miss-detection rate. A false alarm refers to WUR STAs falsely detecting synchronization of a noise even though a synchronization signal has not been transmitted. And, a miss-detection may refer to the WUR STA failing to perform synchronization by missing the synchronization signal, even though the synchronization has been transmitted.

Figure 18:
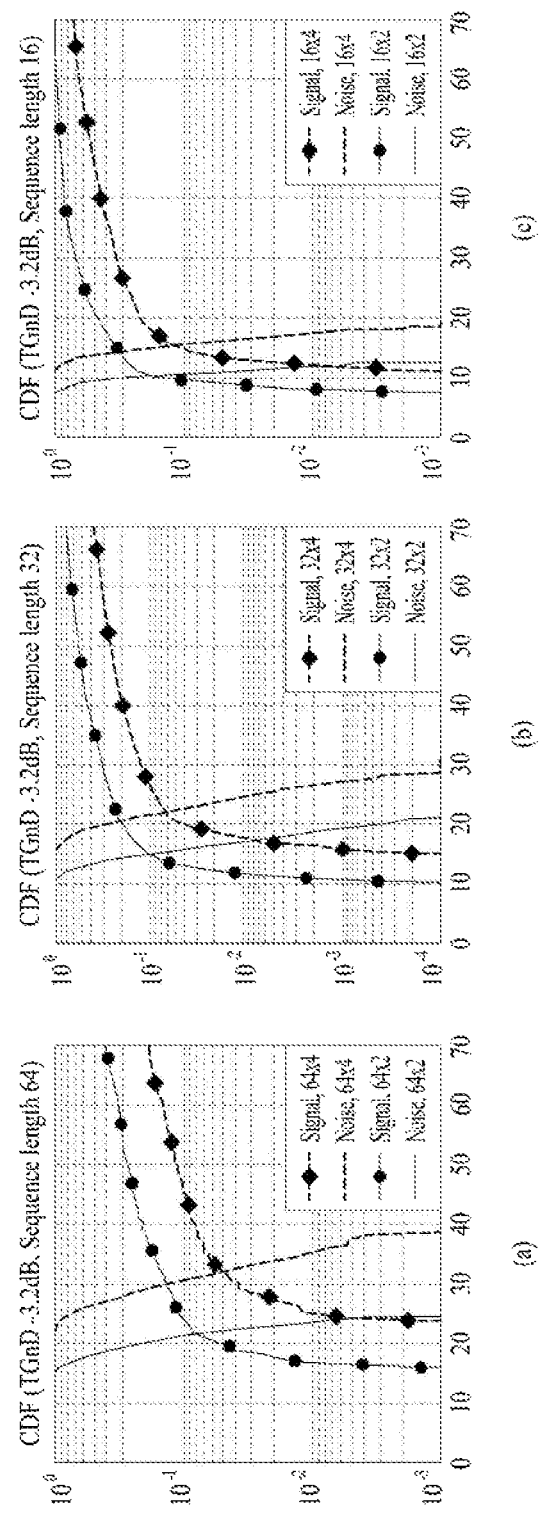
FIG. 18 is a diagram for describing false alarm and miss-detection rates according to a sequence length in a TGnD channel environment.

FIG. 18 is a diagram for describing false alarm and miss-detection rates according to a sequence length in a TGnD channel environment.

Each of (a), (b), and (c) of FIG. 18 respectively indicates cases where the length of the synchronization sequence is equal to 64, 32, and 16. Each of (a), (b), and (c) indicates a cumulative distribution function (CDF) for a peak value of cross correlation in a case where the synchronization sequence is mapped to a symbol configured of 4 us and a CDF for a peak value of cross correlation in a case where the synchronization sequence is mapped to a symbol configured of 2 us.

In a WUR packet, it is assumed that an L-preamble and a 1 BPSK symbol are equal to a total of 24 us, and it will also be assumed that a length-16 sequence is [0,1,0,0,0,1,1,1,1, 0,1,0,1,1,0,0], that a length-32 sequence is [1,1,1,1,1,0,1,0, 0,0,1,1,1,0,0,1,1,1,0,0,1,0,0,1,0,0,0,0,1,0,1,0], and that a length-64 sequence is [0,0,0,0,0,1,0,0,0,0,1,1,0,0,0,1,0,1,0, 0,1,1,1,1,0,1,0,0,0,1,1,1,0,0,1,0,0,1,0,1,1,0,1,1,1,0,1,1,0,0,1, 1,0,1,0,1,0,1,1,1,1,1,1,0]. Additionally, as the payload is equal to 32 bits, it is assumed that a 4 us data symbol is being used.

The dotted line indicates the CDF for a peak value of the cross correlation when there is no signal transmission as '1-CDF', and this represents the rate of a False alarm. The solid line indicates the CDF for a peak value of a case where the synchronization signal is transmitted, and this represents the rate of a Miss-detection. The indication of 64×4 denotes sequence number×symbol length (us).

Table 1 shown below indicates miss-detection rates of a case where the false alarm is 1% and a case where the false alarm is 10%. In case the miss-detection rate is 10%, this may indicate that when the AP transmits a synchronization signal 10 times, the WUR STA fails to detect the synchronization signal 1 time. And, this indicates that performance degradation is severe.

Therefore, when considering the miss-detection rate, it may be preferable that the length of a synchronization signal is equal to 128 us or more. For example, the synchronization signal may correspond to 32×4 us, 64×2 us or 64×4 us. However, the present disclosure will not be limited only to this.

TABLE 1

| #seq × symbol length | 64 × 4 | 64 × 2 | 32 × 4 | 32 × 2 | 16 × 4 | 16 × 2 |
| --- | --- | --- | --- | --- | --- | --- |
| False alarm 1% | 6% | 9% | 8.8% | 15% | 16.4% | 24.7% |
| False alarm 10% | 3.8% | 6.4% | 6% | 10.8% | 11.7% | 19.5% |

Figure 19:
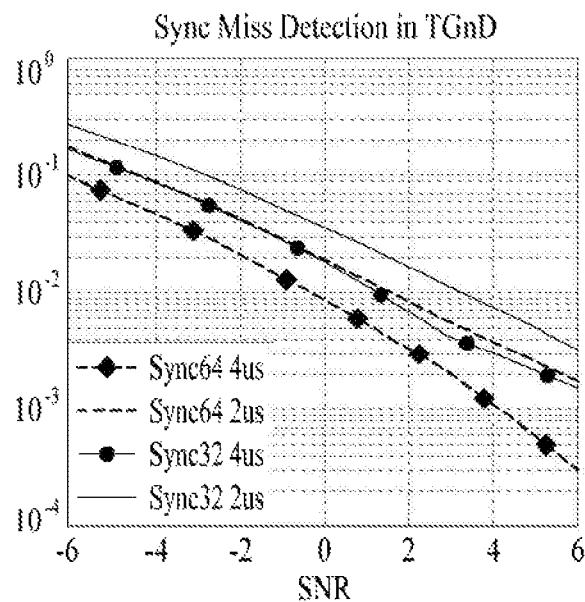
FIG. 19 shows results of measuring the performance of a synchronization signal having a length of 128 us or more.
Figure 19:
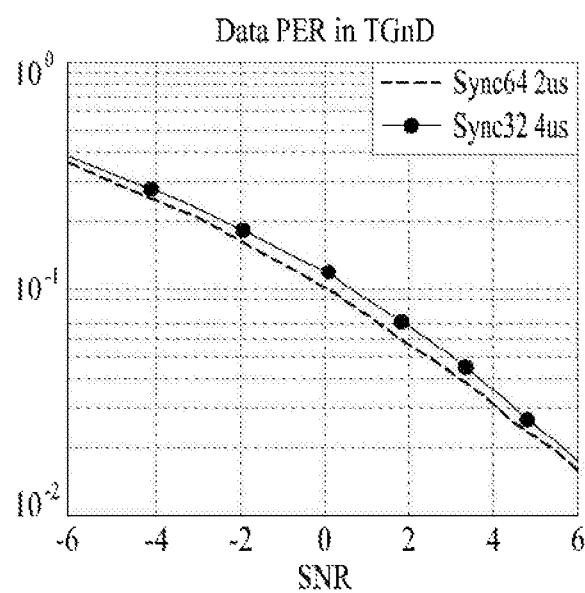

FIG. 19 shows results of measuring the performance of a synchronization signal having a length of 128 us or more based on the results of Table 1. More specifically, (a) of FIG. 19 shows a synchronization miss detection rate of a WUR STA in an actual WUR packet, and (b) of FIG. 19 shows a packet error rate (PER) of data when the WUR STA performs synchronization on the synchronization signal and then decodes the data of the WUR packet.

As shown in FIG. 19, in case the length of the synchronization signal is the same, for example, in case of 64×2 us and 34×4 us, it may be considered that the synchronization detection performance (or capability) is actually the same. Additionally, in case 1 symbol length is equal to 2 us, the data PER performance is shown to be more excellent than the case where the 1 symbol length is equal to 4 us.

Based on the aforementioned simulation results, the embodiment of the present disclosure proposes synchronization signals as described below:

Example 1: A Synchronization Signal of 128 us Based on a Sequence Length of 64 and a Symbol Length of 2 us For example, a sequence of length-64 may be as shown below. However, the present disclosure will not be limited only to this.

[0,0,0,0,0,1,0,0,0,0,1,1,0,0,0,1,0,1,0,0,1,1,1,1,0,1,0,0,0,1, 1,1,0,0,1,0,0,1,0,1,1,0,1,1,1,0,1, 1,0,0,1,1,0,1,0,1,0,1,1,1,1, 1,1,0]

Figure 20:
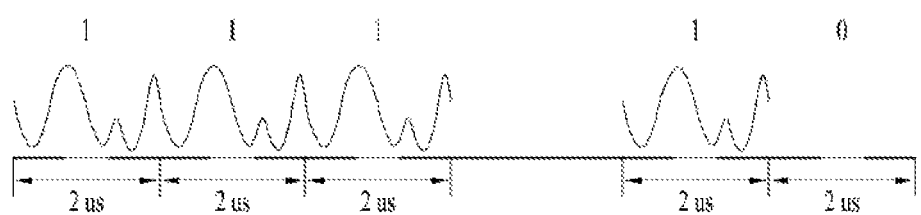
FIG. 20 illustrates a synchronization signal of 128 us based on a sequence length of 64 and a symbol length of 2 us.

FIG. 20 illustrates a synchronization signal of 128 us based on a sequence length of 64 and a symbol length of 2 us according to Example 1.

Example 2: A Synchronization Signal of 128 us Based on a Sequence Length of 32 and a Symbol Length of 4 us For example, a length-32 sequence may be a Golay sequence, as shown below. However, the present disclosure will not be limited only to this.

[1,1,1,1,1,0,1,0,0,0,1,1,1,0,0,1,1,1,0,0,1,0,0,1,0,0,0,0,1,0, 1,0] or

[1,0,0,0,0,1,0,1,1,1,0,0,0,1,1,0,1,1,0,0,1,0,0,1,0,0,0,0,1,0, 1,0], and so on.

Example 3: A Synchronization Signal of 256 us Based on a Sequence Length of 64 and a Symbol Length of 4 us Meanwhile, for an auto-gain control (AGC) of the WUR STA, the aforementioned length-64 sequence or the length-32 sequence may be configured to start with '1010 . . . '. In this case, the WUR STA may use 1010 . . . at a front part (or beginning) of a preamble synchronization sequence for the AGC, and, thereafter, the WUR STA may use all sequences to obtain time synchronization. As described above, the synchronization sequence may be used for two purposes: AGC and obtaining synchronization.

The following sequences are examples where 1 and 0 are alternately repeated at the beginning of the synchronization sequence for the AGC.

A length-64 sequence:
[1,0,1,0,1,0,1,1,1,1,1,1,0,0,0,0,0,0,1,0,0,0,0,1,1,0,0,0,1,0, 1,0,0,1,1,1,1,0,1,0,0,0,1,1,1,0,0, 1,0,0,1,0,1,1,0,1,1,1,0,1,1, 0,0,1]

A length-32 sequence:
[1,0,1,0,1,0,0,0,0,1,0,1,1,1,0,0,0,1,1,0,1,1,0,0,1,0,0,1,0,0, 0,0] or
[1,0,1,0,1,1,1,1,1,0,1,0,0,0,0,1,1,1,1,0,0,1,1,1,0,0,1,0,0,0,1,0,0, 0,0] or
[1,0,1,0,1,1,1,0,1,1,0,0,0,0,1,1,1,1,1,1,0,0,0,1,1,0,1,0,0,0,0,1,0,0, 0,0]

A length-16 sequence: [1,0,1,0,1,1,0,0,0,0,1,0,0,0,0,1,1,1]

Tx Signal Generation in WUR

Hereinafter, a method for generating a WUR signal will be proposed.

The AP may use the following method for generating a signal in order to transmit a WUR packet. Subcarrier spacing may be 312.5 kHz. 52 subcarriers may be used for the transmission of an L-preamble, and DC 1 subcarrier and guard 11 subcarriers may be used. In order to prevent other PCR STAs from misrecognizing the WUR packet as their own signals, 1 BPSK symbol may be transmitted after the L-preamble over a 20 MHz band in the time axis. After the 1 BPSK symbol, a WUR preamble and data are transmitted over a narrow band.

Figure 21:
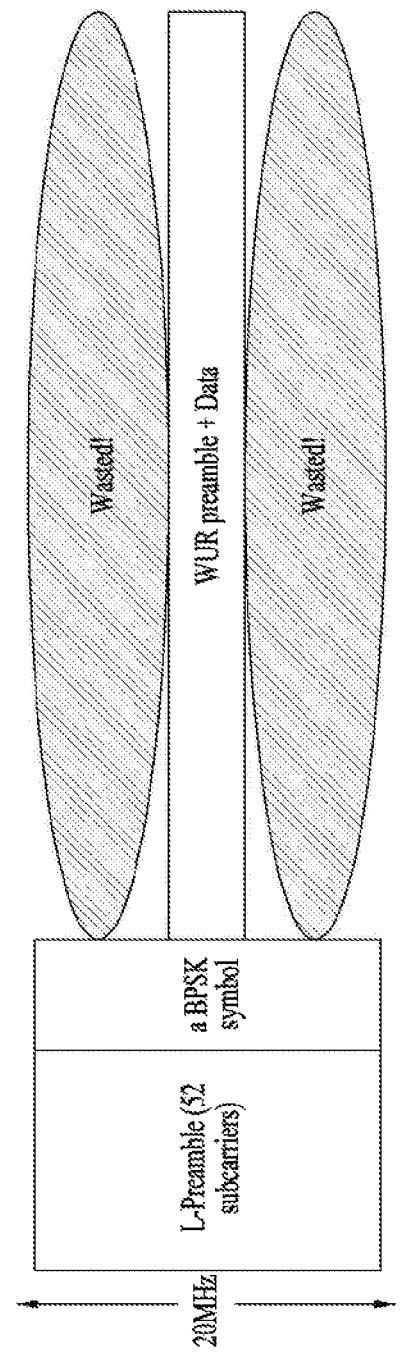
FIG. 21 shows an exemplary case of a WUR packet being transmitted in a 20 MHz band.

FIG. 21 shows an exemplary case of a WUR packet being transmitted in a 20 MHz band. The location of the WUR packet on the frequency axis may vary.

3rd party STAs operating in the PCR mode mostly perform clear channel assessment (CCA) in units of 20 MHz or more. Therefore, in case the WUR packet is transmitted at 4 MHz, and in case the reception power of the WUR packet is low, in the 3rd party STAs operating in the PCR mode, the reception power of the WUR packet may be determined to be equal to or less than a CCA threshold value for 20 MHz, and the 3rd party STAs may attempt to perform signal transmission.

Most particularly, in case of a 5 GHz band, since the transmission power per 1 MHz width is restricted, as compared to a case of transmitting a signal by a 20 MHz bandwidth, the reception power of a 3rd party STA may be lower in case of transmitting a signal by a 4 MHz bandwidth. Therefore, the 3rd party STA may misrecognize (or misinterpret) a CCA result channel as being idle.

In order to resolve the aforementioned problem, the embodiment of the present disclosure proposes the following method.

The AP may transmit a WUR packet at a bandwidth of 4 MHz or more. For example, when transmitting an OOK ON signal (e.g., OOK on symbol), the AP may transmit a signal for a 20 MHz bandwidth. For an OOK OFF signal (e.g., OOK off symbol), the AP does not transmit any signal. For example, in order to transmit an OOK ON signal (e.g., OOK on symbol) at a bandwidth of 20 MHz, the AP may use a preamble sequence of an existing (or old) PCR, such as L-LTF/STF, and so on.

Figure 22:
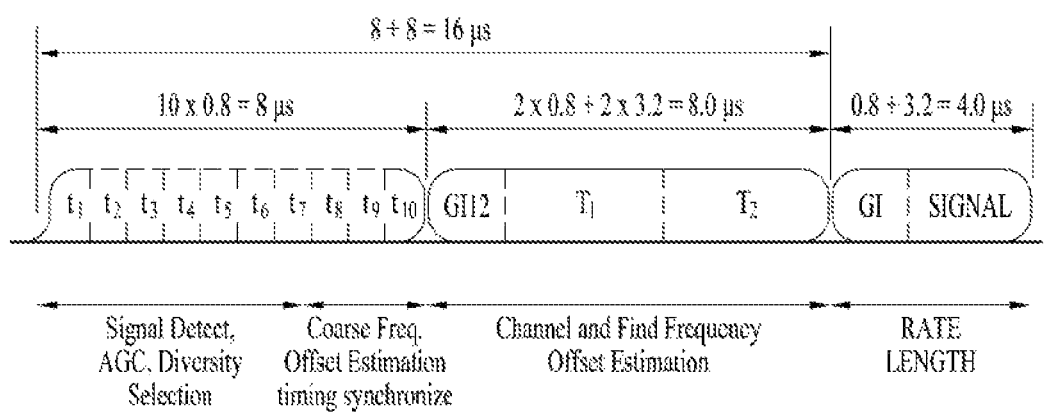
FIG. 22 illustrates structures of L-STF and L-LTF.

FIG. 22 illustrates structures of L-STF and L-LTF.

A case of using an L-STF sequence as an ON-signal will first be described. Herein, an ON-signal may be an ON-signal of a generic OOK symbol or an ON-signal of an OOK symbol having Manchester coding applied thereto. The L-STF sequence is configured of a structure wherein a signal of 0.8 us is repeated 10 times, as the first Bus (i.e., t1~t10) of FIG. 22. Therefore, in case the data rate of the WUR packet is 250 kpbs, an ON-signal of 2 us may be configured of CP+0.8 us×2. The CP may be the last 0.4 us of the 0.8 us signal. In case the data rate is 62.5 kbps, a 4 us ON-signal may be configured of 0.8 us*5, or an Bus ON-signal may be configured of 0.8 us*10.

Hereinafter, a case wherein the L-LTF sequence is used as an ON-signal will be described. L-LTF is configured as a second Bus signal (GI2+T1+T2) of FIG. 22. Therefore, in case the data rate of the WUR packet is 250 kbps, the AP may obtain a 1.6 us signal from T1 for the 2 us ON-signal and may then use the obtained signal by attaching a CP of 0.4 us to the obtained 1.6 us signal. Alternatively, the AP may select and use the 2 us part from the L-LTF signal. Therefore, in case the data rate of the WUR packet is 62.5 kbps, the AP may attach a 0.8 us CP to the T1 signal for the 4 us ON-signal. Alternatively, the AP may select and use the 4 us part from the L-LTF signal. The AP may directly use the L-LTF for the Bus ON-signal.

As another method, for the ON-signal, a 1-bit BPSK symbol, which is included in the WUR packet after the L-preamble, may also be used. Since 1 BPSK symbol has a length of 4 us (=0.8 us CP+3.2 us signal), in case the data rate of the WUR packet is 250 kbps, the AP may use part of a 3.2 us signal to attach a 0.4 us CP to the obtained 1.6 us signal and may use the processed signal as the 2 us ON-signal. Alternatively, the AP may also use part of a 4 us signal to generate a 2 us ON-signal. In case the data rate of the WUR packet is 62.5 kbps, the AP may use a whole 4 us 1 BPSK symbol as the ON-signal.

According to the embodiment of the present disclosure, it is advantageous in that the AP may directly re-use an existing signal (or old signal) without having to generate a new synchronization signal for the WUR packet. Conversely, the STA may detect the WUR packet by receiving only a 4 MHz bandwidth signal without having to monitor the whole 20 MHz bandwidth.

Figure 23:
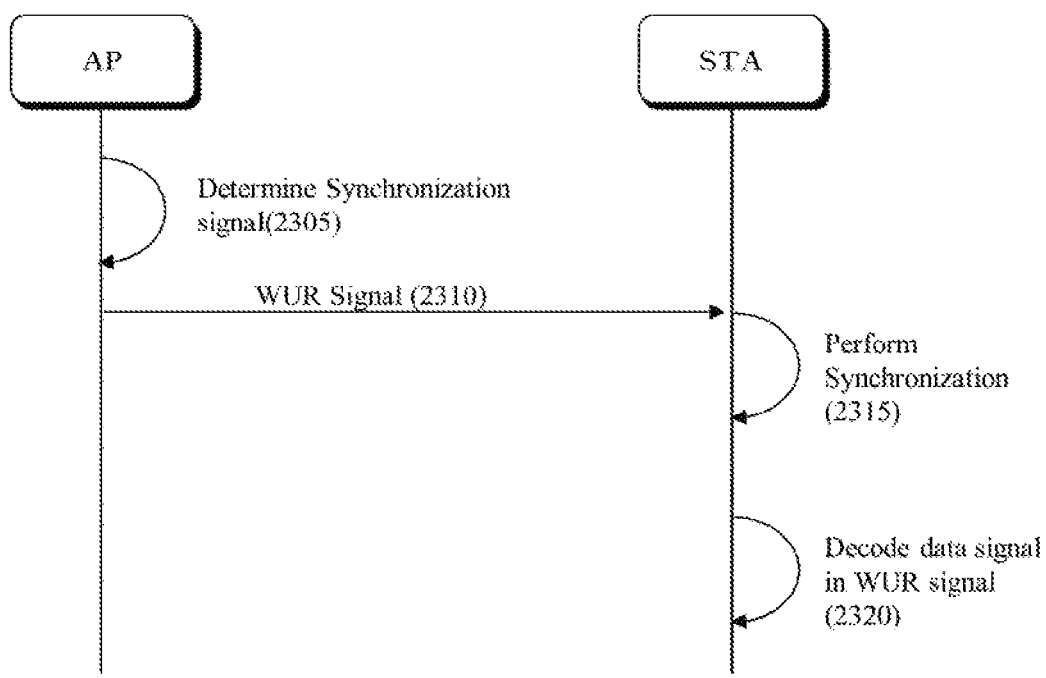
FIG. 23 illustrates a flow chart of a method for transmitting and/or receiving a WUR signal according to an embodiment of the present disclosure.

FIG. 23 illustrates a flow chart of a method for transmitting and/or receiving a WUR signal according to an embodiment of the present disclosure. Since FIG. 23 is merely a realization form according to the above-described embodiments, the present disclosure will not be limited only to the embodiment shown in FIG. 23, and detailed description overlapping with the aforementioned description may be omitted.

Referring to FIG. 23, the AP determines a synchronization signal providing time synchronization for a data signal of a WUR signal (2305).

For example, the synchronization signal may be determined in accordance with a data rate of the data signal. The AP may determine the data rate of the data signal as any one of 62.5 kbps and 250 kbps. In case the data rate is 62.5 kbps, a first synchronization signal may be used. And, in case the data rate is 250 kbps, a second synchronization signal may be used. The STA may determine the data rate applied to the data signal based on the synchronization signal.

For example, when the data rate of the data signal is 62.5 kbps, the synchronization signal may be an on-off keying (OOK) signal having a length of 128 us, which is generated by mapping each bit of a length-64 binary sequence to a 2 us symbol. The binary sequence may start with a pattern wherein 1 and 0 are alternately repeated during a predetermined length. The alternately repeating pattern of 1 and 0 may be for an auto-gain control (AGC) of the WUR signal.

Manchester coding may be applied to the data signal.

In case the data rate of the data signal is 250 kbps, as a result of applying Manchester coding to the data signal, 1 symbol of the data signal may be configured of one On sub-symbol and one Off sub-symbol.

The AP may use the On sub-symbol of the data signal as the 2 us-length On symbol for the synchronization signal. The On sub-symbol of the data signal may be generated by re-using at least part of a legacy long training field (L-LTF), a legacy-short training field (L-STF), and 1 binary phase shift keying (BPSK) symbol being transmitted from the WUR signal at a 20 MHz bandwidth.

A 1-symbol length of the data signal may be configured to be longer than length 2 us of 1 symbol for the synchronization signal.

The AP transmits a WUR signal including the synchronization signal and the data signal (2310).

The STA performs time synchronization by using the synchronization signal of the WUR signal (2315).

The STA decodes the data signal based on the data rate for the data signal of the WUR signal (2320).

Figure 24:
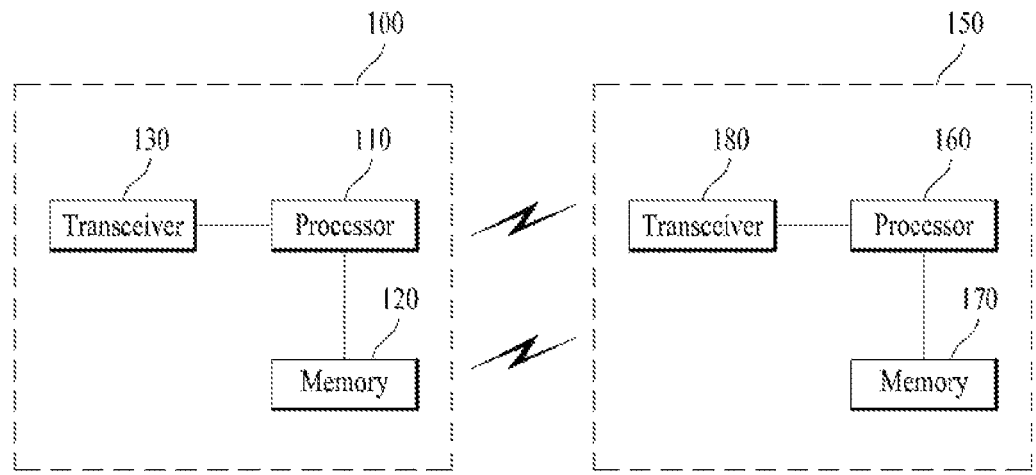
FIG. 24 is a diagram for describing a device according to an embodiment of the present disclosure.

FIG. 24 is a diagram for describing a device for realizing the above-described method.

A wireless device (100) of FIG. 24 may correspond to a specific STA of the description presented above, and a wireless device (850) may correspond to the AP of the description presented above.

The STA (100) may include a processor (110), a memory (120), a transceiver (130), and the AP (150) may include a processor (160), a memory (170), a transceiver (180). The transceiver (130 and 180) may transmit/receive radio signals and may be executed in a physical layer of IEEE 802.11/3GPP, and so on. The processor (110 and 160) may be executed in a physical layer and/or a MAC layer and is/are operatively connected to the transceiver (130 and 180). The processor (110 and 160) may perform the aforementioned UL MU scheduling procedure.

The processor (110 and 160) and/or the transceiver (130 and 180) may include an application-specific integrated circuit (ASIC), another chipset, a logical circuit and/or a data processor. The memory (120 and 170) may include a read-only memory (ROM), a random access memory (RAM), a flash memory, a memory card, a storage medium and/or another storage unit. When the embodiments are executed by software, the above-described method may be executed with modules (e.g., processes, functions, and so on) that perform the functions described herein. The modules may be stored in the memory (120, 170) and executed by the processor (110, 160). The memory (120, 170) may be positioned inside or outside of the processor (110, 160) and may be operatively connected to the processor (110, 160) by using various means well-known in the art.

The transceiver (130) of the STA may include a transmitter (not shown) and a receiver (not shown). The receiver of the STA may include a Primary Connectivity Radio receiver for receiving Primary Connectivity Radio (e.g., wireless LAN, such as IEEE 802.11 a/b/g/n/ac/ax, and so on) signals and a WUR receiver for receiving WUR signals. The transmitter of STA may include a Primary Connectivity Radio transmitter for transmitting Primary Connectivity Radio signals.

The transceiver (180) of the AP may include a transmitter (not shown) and a receiver (not shown). The transmitter of the AP may correspond to an OFDM transmitter. The AP may re-use the OFDM transmitter so as to transmit a WUR payload by using an OOK scheme. For example, as described above, the AP may perform OOK modulation on a WUR payload through the OFDM transmitter.

As described above, the disclosed detailed description of the preferred embodiment of the present disclosure is provided to allow anyone skilled in the art to realize and execute the present disclosure. Although the detailed description of this specification is presented with reference to the preferred embodiment of the present disclosure, it shall be understood that anyone having ordinary skills in the corresponding technical field may variously modify and change the present disclosure. Therefore, the scope and spirit of the present disclosure will not be limited only to the exemplary embodiments of the present disclosure set forth herein. Thus, it is intended to provide the broadest scope and spirit of the appended claims of the present disclosure that are equivalent to the disclosed principles and novel characteristics of the present disclosure.

INDUSTRIAL APPLICABILITY

The present disclosure may be applied to various wireless communication systems including IEEE 802.11.

What is claimed is:

1. A method for transmitting a wake-up radio (WUR) signal, by an access point (AP), in a wireless LAN (WLAN), the method comprising:
   determining a synchronization signal providing time synchronization for a data signal of the WUR signal; and
   transmitting the WUR signal including the synchronization signal and the data signal,
   wherein, when a data rate of the data signal is 62.5 kbps, the synchronization signal is an on-off keying (OOK) signal being generated by mapping each bit of a synchronization sequence to a 2us symbol,
   wherein the synchronization sequence has 64 bits, and
   wherein a duration of the synchronization signal is 128us.

2. The method of claim 1, wherein the synchronization sequence starts with a pattern of 1 and 0 being alternately repeated during a predetermined length.

3. The method of claim 2, wherein the alternately repeating pattern of 1 and 0 is for an auto-gain control (AGC) of the WUR signal.

4. The method of claim 1, wherein the AP determines the data rate of the data signal as one of 62.5 kbps and 250 kbps.

5. The method of claim 4, wherein Manchester coding is applied to the data signal,
   wherein, in case the data rate of the data signal is 250 kbps, as a result of applying Manchester coding to the data signal, 1 symbol of the data signal is configured of one On sub-symbol and one Off sub-symbol, and
   wherein the AP uses the On sub-symbol of the data signal as a 2us-length On symbol for the synchronization signal.

6. The method of claim 5, wherein the On sub-symbol of the data signal is generated by re-using at least part of a legacy long training field (L-LTF), a legacy-short training field (L-STF), and 1 binary phase shift keying (BPSK) symbol being transmitted from the WUR signal at a 20 MHz bandwidth.

7. The method of claim 1, wherein a length of 1 symbol of the data signal is configured to be longer than a length of 1 symbol for the synchronization signal, and
   wherein the length of 1 symbol for the synchronization signal is 2us.

8. A method for receiving a wake-up radio (WUR) signal, by a station (STA), in a wireless LAN (WLAN), the method comprising:
   performing time synchronization by using a synchronization signal of the WUR signal; and
   decoding the data signal based on the data rate for the data signal of the WUR signal,
   wherein, when a data rate of the data signal is 62.5 kbps, the synchronization signal is an on-off keying (OOK) signal being generated by mapping each bit of a synchronization sequence to a 2us symbol,
   wherein the synchronization sequence has 64 bits, and
   wherein a duration of the synchronization signal is 128us.

9. The method of claim 8, wherein the synchronization sequence starts with a pattern of 1 and 0 being alternately repeated during a predetermined length.

10. The method of claim 9, wherein the alternately repeating pattern of 1 and 0 is for an auto-gain control (AGC) of the WUR signal.

11. The method of claim 8, wherein the AP determines the data rate of the data signal as one of 62.5 kbps and 250 kbps.

12. The method of claim 8, wherein a length of 1 symbol of the data signal is configured to be longer than a length of 1 symbol for the synchronization signal, and wherein the length of 1 symbol for the synchronization signal is 2us.

13. An access point (AP) for transmitting a wake-up radio (WUR) signal, comprising:
 a processor determining a synchronization signal providing time synchronization for a data signal of the WUR signal; and
 a transmitter transmitting the WUR signal including the synchronization signal and the data signal based on a control of the processor,
 wherein, when a data rate of the data signal is 62.5 kbps, the synchronization signal is an on-off keying (OOK) signal being generated by mapping each bit of a synchronization sequence to a 2us symbol,
 wherein the synchronization sequence has 64 bits, and
 wherein a duration of the synchronization signal is 128us.

* * * * *